United States Patent [19]
Baumgartner et al.

[11] 3,828,343
[45] Aug. 6, 1974

[54] OPERATIONAL METHOD AND APPARATUS FOR THE REPRESENTATION OF CHARACTERS

[75] Inventors: Heinrich Baumgartner; Manfred Schultze, both of Munich, Germany

[73] Assignee: Siemens Aktiengesellschaft, Berlin and Munich, Germany

[22] Filed: Nov. 30, 1972

[21] Appl. No.: 310,764

[30] Foreign Application Priority Data
Feb. 29, 1972 Germany ............................ 2209573

[52] U.S. Cl. ............ 340/324 A, 315/18, 340/172.5
[51] Int. Cl. ............................................ G06f 3/14
[58] Field of Search ................................ 340/324 A

[56] References Cited

UNITED STATES PATENTS 3,614,743 10/1971 Ruben ........................ 340/324 A X

*Primary Examiner*—David L. Trafton
*Attorney, Agent, or Firm*—Hill, Gross, Simpson, Van Santen, Steadman, Chiara & Simpson

[57] ABSTRACT

A method and apparatus for the representation of characters which consist of character segments wherein data are fed-in in the form of data words by a character input system and a read only memory storing character segment data and a deflection unit are employed to cause deflection of a cathode ray, ink jet or the like of a character producing device in accordance with the character segment data, and wherein a bit is stored in a storage cell and its binary value depends on control data which are stored in the read only memory. Address words are supplied to the read only memory which are formed partially of the words of the character input system and partially of the bit stored in the storage cell. Among the characters which must be represented in a timely succession, those will be represented whose address words are formed of words of the character input system and of the first value of the stored bit. With one of the address words, the control data are read from the read only memory and cause a second value of the bit. Those characters which have to be represented in a timely succession will be illustrated whose address words are formed of bits obtained from the character input system and of the second value of the stored bit.

4 Claims, 3 Drawing Figures

OPERATIONAL METHOD AND APPARATUS FOR THE REPRESENTATION OF CHARACTERS

BACKGROUND OF THE INVENTION

1. Field of the Invention

This invention relates to an operational method and apparatus for the representation of characters consisting of character segments wherein a data input is provided in the form of words by a character input device and more specifically where the input data is utilized to excess a read only memory which stores character segment data and a deflection unit is employed to effect deflection of a character writing apparatus, depending on the character segment data.

2. Description of the Prior Art

The expression "character" is to be taken herein in its broadest sense in that one may be concerned with alphanumeric symbols, therefore with letters and numerals, and also with graphic symbols which represent more or less complicated lines. A computer or keyboard may be provided as a character input system whereby it should also be taken into account that such character input devices may be relatively remote from the read only memory of a visual data device so that the code words corresponding to the character must be transmitted over considerable distances, as is well known in the art.

A cathode ray may, for example, be provided as a character writing element, whereby it is deflected in several coordinate directions with the help of a deflection unit and renders visible the individual character segments of the character upon the picture screen of a cathode ray tube.

The character producing apparatus, however, may also take the form of an ink jet which is deflected in several coordinate directions with the help of a deflection unit in such a way that it will write characters upon strip-shaped material or upon sheet-shaped material. In addition, pencils or pens may be provided as character producing members which are deflected in several coordinate directions with the help of a deflecting unit and which will accordingly write the characters.

As it is known, the code words emitted by a character input device and corresponding to the characters may be coded in the ISO seven bit code so that basically $2^7 = 128$ different code words are available. A data transmission control system, a parallel/series converter, a modulator, a transmission line, a demodulator and a series/parallel converter may be required for transmitting these code words from the character input system to the visual data indicator. The timely emission of the data is controlled by the character input system with the help of a data transmission control system. The data emitted in parallel by the character input system are converted into a serial data succession. Different frequencies are assigned to the binary values in the modulator. In the demodulator, the binary values are regained from the two different transmitted frequencies. In the series/parallel converter, the serially transmitted data are further processed by way of parallel lines. The transmission line by way of which the data are transmitted may, for example, have a length of from 1km through 10,000km. All of the aforementioned system components are relatively inexpensive and readily available on the market, and therefore more easily obtained and utilized in connection with the present invention then specially constructed apparatus, as will be explained below.

If the 128 code words are not sufficient to characterize the desired characters, the basic thought might be to apply an eight bit code instead of the seven bit code and to address the read only memory with eight-bit code addresses. In this case, however, all the systems for transmitting the data, in particular the data transmission control system, the parallel/series converter, and the series/parallel converter would have to be developed and produced, since these devices are not available on the market. The development of these devices would cause essential development cost and an attendant long period of development time.

SUMMARY OF THE INVENTION

The present invention has as its object to represent a relatively large number of characters while utilizing devices which are readily available on the market for transmitting code words corresponding to the characters.

The characters which are to be represented may, as it is known, be subdivided into several classes, for example into a class of letters, a class of numerals, and a class of graphic symbols. The present invention is based on the recognition that often several symbols of one class are represented one after the other before the representation of symbols of another class is initiated.

The operational method for representing the characters is particularly characterized, according to this invention, in the following steps:

1. A bit is stored in a storage cell comprising a binary value depending on control data which are stored in the read only memory.
2. The read only memory is supplied with address words which are partially formed of the words of the character input device and partially of the bit stored in the storage cell whose binary value depends on the control data.
3. Among the characters which have to be represented in a timely succession, those characters are represented whose address words are formed of words fed in by the charactr input system and of the first value of the stored bit.
4. The control data, which causes a second value of the stored bit, are read out of the read only memory with one of the address words.
5. Those characters which have to be represented in a timely succession are represented whose address words are formed of the words fed in by the character input system and of the second value of the stored bit.

Therefore, a certain class of characters is characterized by a bit whose binary value is dependent on the control data. For example, a first value of this bit may signify the class of alphanumeric symbols and a second value of this bit may characterize graphic symbols. As long as this bit assumes the first value, the words of the character input system are interpreted as letters and numerals. If graphic symbols are to be represented, the control data will be read out of the read only memory with one of the address words from the character input system, and the second value of the stored bit is changed. The words fed in with the help of the character input system are now interpreted as graphic symbols in combination with the second value of the bit. If an alphanumeric symbol is suppose to be represented again after the last graphic symbol, then control data may again be read out of the read only memory with the help of the character input system and again a change of the value of the stored bit will be effected.

The invention is characterized in that it allows the representation of a relatively great number of characters with relatively few code words. The application of the operational method according to the invention is then particularly advantageous when the code words of the character input system must be serially transmitted by way of a transmission path, since in this case systems which are readily available on the market can be utilized if the invention is applied, whereas special systems would have to be developed without the application of the invention.

In a most simple case, a bistable flip-flop stage may be provided as a storage cell which is supplied with control data read out of the read only memory and which emits the bit by way of an output to the input of the read only memory, depending on the control data.

In many cases, it would be advantageous to form more than two classes of characters and to associate a specific bit combination with each of these classes. The read only memory is then provided with address words which are partially formed of the words input from the character input system and partially of the corresponding bit combination. In this case, it will be advantageous to read out different combinations of control data from the read only memory with several specific address words and to therefore adjust a specific bit combination which is associated with the class of characters which is to be represented.

In a preferred embodiment of a circuit arrangement for carrying out the operational method of the invention, a decoder is provided which is supplied with the control data read out of the read only memory and which supplies signals to a memory system, depending on the control data.

BRIEF DESCRIPTION OF THE DRAWINGS

Other objects, features and advantages of the invention, its organization, construction and operation will be best understood from the following detailed description of a preferred embodiment thereof taken in conjunction with the accompanying drawings, on which like reference numerals represented in different figures refer to like components or signals, and on which.

DESCRIPTION OF THE PREFERRED EMBODIMENT

Figure 1:
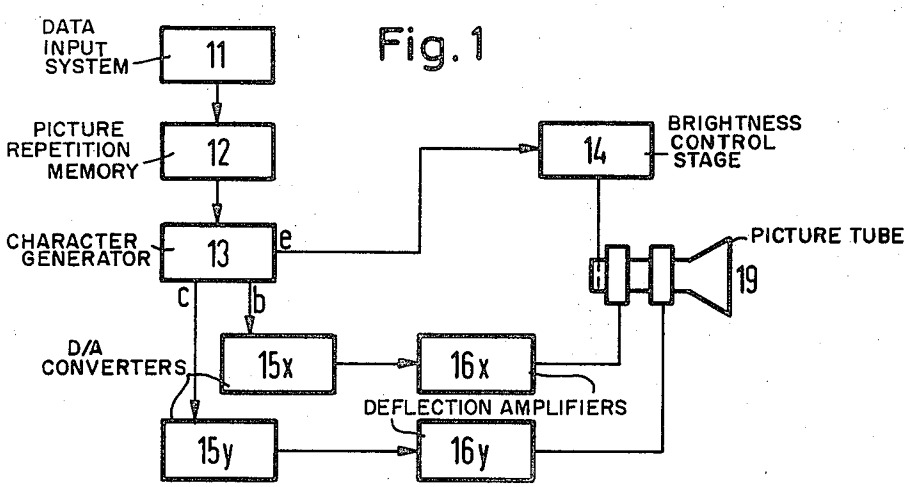
FIG. 1 is a schematic block diagram of a visual data device.

A visual data device is schematically illustrated in FIG. 1 and comprises a character input system 11 which may be a keyboard or computer as well known in the art, an image repetition memory 12, a character generator 13, a brightness control stage 14, a digital/analog converter 15*x* for the *x*-deflection, a digital/analog converter 15*y* for the *y*-deflection, a deflection signal amplifier 16*x* for *x*-deflection, a deflection signal amplifier 16*y* for *y*-deflection and a picture tube 19. This visual data device has the task of representing several characters on the picture screen of the picture tube 19, whose type and position can be influenced with the help of the character input system 11.

Data are fed-in in the form of words with the help of the character input system 11. The characters which are to be represented are selected with the help of these words and shifting of the represented characters, erasure of individual characters and insertion of characters at certain places on the picture screen of the picture tube 19 are effected. As mentioned above, a computer may be provided as the character input system 11 and may be arranged at a great distance from the picture repetition memory 12 and connected thereto by way of a transmission system (not illustrated).

The words of the character input system 11 are stored in the picture repetition memory 12. Since the picture of the picture tube 19 must be continuously regenerated, individual characters are written approximately 50 times per second. The words which serve for selecting the characters are therefore emitted by the picture repetition memory 12 approximately 50 times per second. These words determine the succession of the represented characters and thus their positions upon the picture screen of the picture tube 19.

The characters generally consist of several segments, hereinafter called character segments. The data of these character segments are stored in the character generator 13. These character segment data characterize the shape of the written character segments and the brightness thereof.

The character segment data are supplied to the digital/analog converters 15*x* and 15*y* which produce the analog deflection signals for deflecting the cathode ray in the *x*-and *y*-directions, respectively. The signal amplifiers 16*x* and 16*y* are respectively connected to the *x*-deflection coil and the *y*-deflection coil of the picture tube 19. The cathode ray of the picture tube 19 will then write the character segments.

Furthermore, a brightness signal is produced in the character generator 13, which signal is amplified in the brightness control stage 14. Thus, the intensity of the cathode ray of the picture tube 19 will be controlled.

Therefore, if the words, with the help of which a certain character is selected, are emitted approximately 60 times per second by the picture repetition memory 12, then the associated character segment data are emitted by the character generator 13, and both brightness signals and deflection signals are produced in a further succession, and thus the cathode ray of the picture tube 19 is deflected in such a way that it writes the desired character segments and the desired characters.

Figure 2:
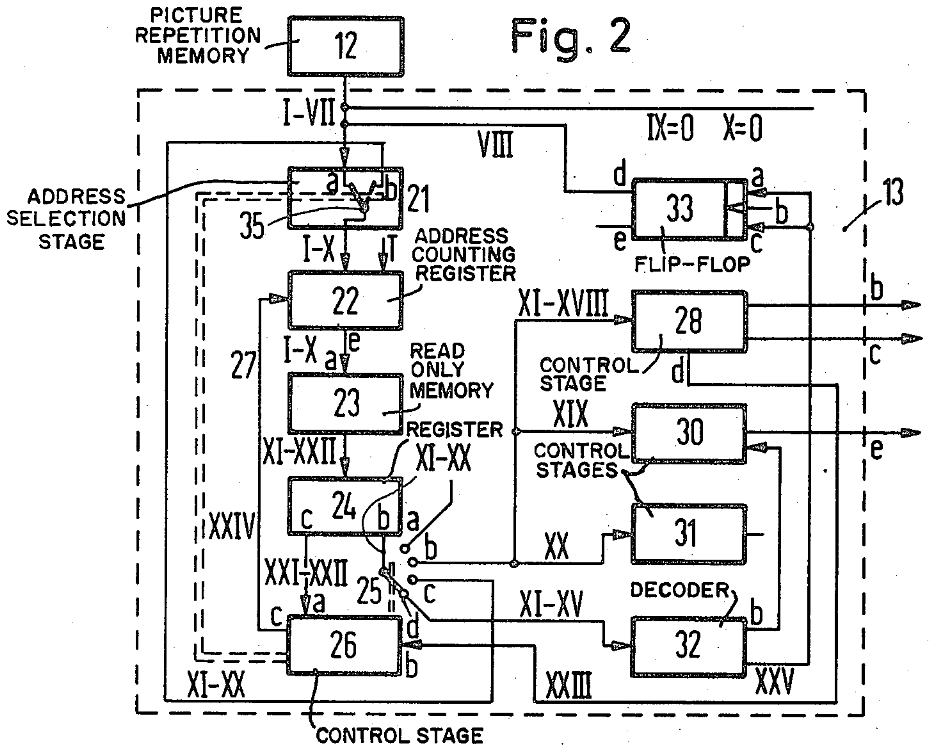
FIG. 2 is a logic block diagram of a character generator which is a component of the visual data device illustrated in FIG. 1.

FIG. 2 illustrates in a logic block diagram form the character generator 13 represented in FIG. 1. The character generator 13 comprises an address selection stage 21, an address counting register 22, a read only memory 23, a register 24, a switch stage 25, control stages 26, 28, 30 and 31, a decoder 32 and a flip-flop stage 33.

In FIG. 2 parallel lines are only represented by an individual line in order to obtain a more simple representation. The Roman numerals adjacent the lines indicate the binary digits which are transmitted by way of these lines. A line is provided for each bit. The two binary values are denoted by "0" and "1". Signals assuming a "0" value or a "1" value, respectively, are denoted by a "0" signal or a "1" signal. In a similar manner, the two states which can be assumed by the bistable flip-flop stage are denoted by the "0" state or the "1" state, respectively.

Words are emitted in the seven bit ASCII Code by way of the lines I through VII from the output of the picture repetition memory 12. In addition to these seven bits, the bits VIII = 0, IX = 0, X = 0 are applied to the address selection stage 21.

The address selection stage 21 essentially consist of a switch 35 which may assume the fully drawn switch position 35*a* and the broken line drawn switch position 35*b*, and which is conditioned into one of these two switch positions by means of the control stage 26. A total of ten digits are emitted toward the address counting register 22 in the position 35*a* by way of the lines I through X. In the switch position 35*b*, the address selection stage 21 is connected with the contact *c* of the switch stage 25.

The bits I through X are supplied to the address counting register 22, and the bit XXIV is applied as a control signal by way of the line 27. Depending on this control signal, the address counting register 22 is operated in either a first or a second mode of operation. The bits I through X supplied by the address selection stage 21 are stored in the address counting register 22 during the first mode of operation and emitted without change to the read only memory 23 as an address word. The bits I through X are also stored in the address counting register 22 during the second mode of operation, but the binary member provided by the bits I through X is increased by 1 with the application of each timing pulse at the input marked T of the address counting register 22. The bits of the increased binary number are emitted as address words to the read only memory 23 by way of the output 22*e*.

The read only memory 23 stores 1,024 words for each 12 bits. The 10 lines I through X which are connected to the input 23*a* serve as address lines. The memory organization of this read only memory can be seen from FIG. 3 and is explained below following the description of FIG. 2.

The words emitted by the read only memory 23, with the bits XI through XXII, are stored in the register 24, and the bits XXI through XX are emitted by way of the output 24*b* to the switch stage 25. The bits XXI and XXII are applied to the control stage 26 by way of the output 24*c*.

The switch stage 25 can assume the switch positions 25*a*, 25*b*, 25*c* and 25*d* and is controlled in accordance with the binary values of the bits XXI and XXII (supplied via the input 26*a*), and depending on the bit XXIII (supplied via the input 26*b*). Furthermore, the control stage 26 will control the switch 35. The control stage 26 therefore functions as a switch position decoder and the following table shows the possible connections.

TABLE 1

| 26*a* XXI | 26*a* XXII | 26*b* XXIII | switch position | 26*c* XXIV |
|---|---|---|---|---|
| 0 | 0 | 1 | 25*b*, | 0 |
| 0 | 0 | 0 | 25*b*, | 1 |
| 0 | 1 | 0 | 25*b*, 35*a*, | 0 |
| 0 | 1 | 1 | 25*a*, 35*a*, | 0 |
| 1 | 0 | 0 | 25*c*, 35*b*, | 0 |
| 1 | 1 | 0 | 25*d*, | 0 |

The control stage 28 causes the deflection of the cathode ray of the picture tube 19 represented in FIG. 1. The amount and direction of this deflection depend on the bits XI through XVIII which are supplied to the control stage 28 in the position 25*b* of the switch stage 25. The output *b* and the output *c* of the control stage 28 and of the character generator 13 are connected with the respective digital/analog converters 15*x*, 15*y*, as illustrated in FIG. 1. The signal XXIII = 1 is emitted from the control stage 28 and applied to the input *b* of the control stage 26 by way of the output 28*d*, always when the cathode beam of the picture tube 19 represented in FIG. 1 has reached that position which it should have reached due to the bits XI through XVIII. The control stage 28 therefore passes the deflection information in digital form to the analog/digital converters 15*x*, 15*y* and decodes the same information for the timely provision of a "1" at its output *d*. Since further details of the control stage 28 are not essential in connection with the present invention the apparatus will not be treated in further detail herein. Likewise, the control stage 31 produces signals which are not essential for understanding the present invention and will not be further discussed.

The control stage 30 produces a signal which is applied to the brightness control stage 14 illustrated in FIG. 1, depending on the value of the bit XIX, by way of the output *e* of the character generator 13, which signal controls the intensity of the cathode ray of the picture tube 19.

The bits XI through XV are applied to the decoder 32 and the bit XXV is produced at one of the outputs of the decoder 32. The following table 2 shows which way the values of the bit XXV depend on the values of the bits XI through XV. The demodulator 32 is constructed in a manner which is well known per se while utilizing prior art components so that detailed discussion is not necessary herein.

TABLE 2

| XV | XIV | XIII | XII | XI | XXV |
|---|---|---|---|---|---|
| 1 | 0 | 0 | 0 | 1 | 1 |
| 1 | 0 | 0 | 1 | 0 | 1 |
| 1 | 0 | 1 | 0 | 0 | 0 |

The flip-flop stage 33 can assume two stable states. In its "0" state or its "1" state, respectively, it will emit a "0" signal or a "1" signal by way of its output *d*. Proceeding from one of the two states the flip-flop stage 33 will always assume the other one of the two states when a signal is supplied by way of the line XXV and the inputs 33*a* and 33*c*, and when simultaneously a timing signal is supplied to the input 33*b*.

Figure 3:
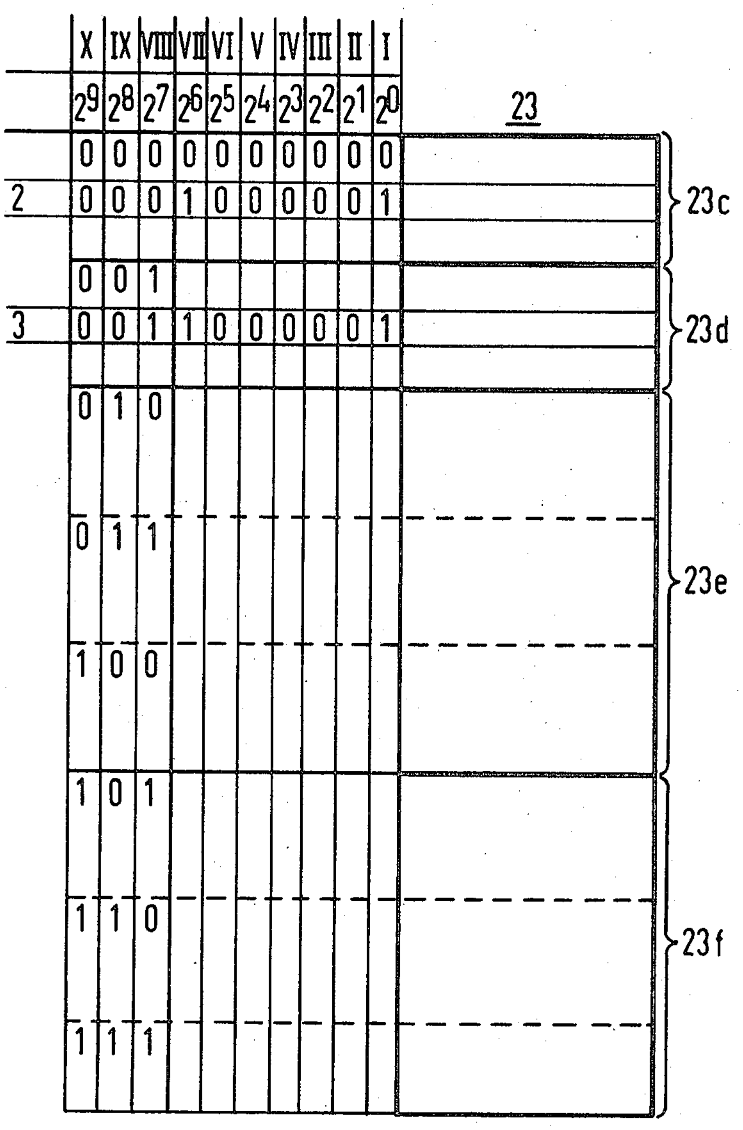
FIG. 3 is a chart which illustrates the occupancy of a read only memory which is a component of the character generator represented in FIG. 2.

FIG. 3 schematically illustrates four storage areas of the read only memory 23. This read only memory is constructed to contain 1,024 code words each having 12 bits. FIG. 3 shows some address words. These address words consist of the bits I through X. Below the words the valencies of the binary values have been inserted, starting from $2^0$ through $2^9$.

The storage area 23*c* is reserved for a first table of contents. It contains the addresses of the character segment data of alphanumeric symbols and control data. This storage area 23*c* stores a total of 128 words which are addressed with the bits I through VII and with the bits VIII = 0, IX = 0 and X = 0.

The storage area 23*d* is reserved for a second table of contents. It contains the addresses of the character segment data of graphic symbols and control data. Again, 128 words can be stored which are addressed with the bits I through VII and with the bits VIII = 1, IX = 0 and X = 0. The character segment data for alphanumeric symbols have been stored in the storage area 23*e* in the form of 3 times 128 words. The character segment data for graphic symbols are stored in the storage area 23*f* in the form of 3 times 128 words.

A subdivision of the read only memory into individual storage areas of characters, of the number of character segments and of the number of control data to be stored can otherwise be done as desired.

In order to explain the mode of operation of the circuit arrangement according to FIG. 2, it is presumed that the switch position 35*a* is contacted in the address selection stage 21, and that the switch stage 25 assumes the switch position 25*a.*

It is furthermore assumed that the bits I through VII of the picture repetition memory 12 and the bits VIII = 0, XI = 0 and X = 0 characterize the letter A. Under these circumstances, the address count register 22 takes over the bits I through X, stores them and emits them by way of the output 22*e* to the read only memory 23 as an address word. These bits I through X are inserted in line 2 of the FIG. 3. The first word read from the storage area 23*c* is stored in the register 24. This first word is the address of the character segment data of the first segment of the character A. In this first word, the bits XXI = 1 and XXII = 0 so that the control stage 26 causes the switch positions 25*c* and 35*b* to be established.

The bits XI through XX of the first word will reach the address counting register 22 by way of the output 24*b*, with the aforementioned switch positions effective. The address counting register 22 is controlled by way of the output 26*c* in such a way that it continues to operate in the first mode of operation. The bits XI through XX of the first word are therefore intermediately stored in the address count register 22 and are then fed into the read only memory 23, without change, as an address. Thereafter, a second word is emitted from the read only memory 23 and stored in the register 24. The bits of the second word are the character segment data of the first character segment of the letter A.

Since we are concerned with a first character segment, the bits XXI = 0 and XXII = 0, such that the bits XI through XX of the second word are stored in the registers of the control stages 28, 30, 31 during the switch position 25*b*. Since the bit XXIV = 0, the counter state of the address count register 22 is increased by 1 with the bits XXI = 0 and XXII = 0.

The bits XI through XVIII of the first word are applied to the control stage 28 with the help of which the deflection of the cathode ray is controlled. When the cathode ray has reached its desired position, a "1" signal will be emitted from the control stage 28 at its output 28*d* and applied to the control stage 26.

The intensity of the cathode ray of the picture tube 19 illustrated in FIG. 1 is controlled with the bit XIX of the second word. This bit XIX is applied to the control stage 30 which is a digital brightness control circuit which determines the desired intensity from the value of the bit and passes a corresponding signal by way of its output *e* to the brightness control circuit 14 of FIG. 1.

The cathode ray has reached the end point of the first segment with the emission of the "1" signal from the ouput 28*d* if the cathode ray has been bright-scanned, then only the first segment of the letter A will become visible on the picture screen of the picture tube 19 illustrated in FIG. 1.

If the bits XXI = 0 and XXII = 0 in the second word then the count state of the count register 22 is increased by 1, the increased count being fed into the read only memory as a new address, and the third word emitted by the read only memory 23 is stored again in the registers of the control stages 28, 30, 31 by way of the register 24 when the switch stage 25 is in the position 25*b*. In this manner, all segments of the letter A are written one after the other, and this process is continued as long as the bits XXI = 0 and XXII = 0.

If the bits XXI = 0 and XXII = 1, which have been read from the register 24, and when furthermore the bit XXII = 1 at the output 26*b*, the last segment of the letter A has been written and the switch position 25*a* and the switch position 35*a* are engaged. These are the switch positions from where the writings of the letter A had been initiated. In a similar manner, further alphanumeric symbols can be written. It was presumed, so far, that the bit VIII = 0 is emitted from the output *d* of the flip-flop stage 33, so that the memory area 23*c* is controlled with the help of the bits IX = 0 and X = 0.

After several alphanumeric symbols have been written, it is assumed that a graphic symbol is to be written upon the picture screen of the picture tube 19. In order to be able to write such graphic symbols, first of all the bits I through X of the address word 1,000 100,000 are fed into the address count register 22 in the read only memory 23. The control data 1,000 10,000,011 are read out of the storage area 23*c* with this address word having the bits XII through XXII. Due to the bits XXI = 1 and XXII = 1, the switch position 25*d* is contacted so that the bits XI through XV reach the decoder 32 which emits the bit XXV = 1 to the flip-flop stage 33 on the basis of this bit combination, as shown in Table 2. This bit XXV = 1 will now cause the "1" state of the flip-flop stage 33 so that the bit VIII is emitted by way of the output *d* in a further succession.

The bit VIII = 1 will no longer control the storage area 23*c*, but the storage area 23*d* which contains the addresses of segment data of graphic symbols and control data. The bit combination of bits I through VII provided in line 3 of FIG. 3 is no longer interpreted as the letter A, but as a graphic symbol. The word read from the storage area 23*d* is stored in the register 24. This word is the address of the character segment data of the first segment of the graphic symbol. In this word the bits XXI = 1 and XXII = 0 again so that the control stage 26 causes the switch stages 25 and 35 to assume the positions 25*c* and 35*b*, respectively.

The bits XI through XX of this word, in the same manner as the bit of the first word for the letter A, will reach the address count register 22 with the switches in the positions noted above, and the register 22 operates again in the first mode of operation. The word is therefore fed as an address into the read only memory 23 which responds by emitting a word whose bits are the character segment data of a first line segment. The individual segments of the graphic symbols are represented in the same manner as the segments of the alphanumeric symbols by utilizing the control stages 28 and 30 as described above. In this manner, a desired amount of segments of the graphic symbols and a desired amount of graphic symbols can be illustrated. During this time, the flip-flop stage 33 will assume its "1" state and will emit the bit VIII = 1 by way of its output *d*.

It is now assumed that the last graphic symbol has been written and that it is now desired to write alphanumeric symbols again. In order to carry out this function, a further address word is fed in by means of the character input system 11, the further address word having bits I through X in the binary form: 0010100100. The storage area 23*d* is addressed with this address word and the control data 001010010011 are read from the read only memory 23. The switch position 25*d* is again established with the bits XXI = 1 and XXII = 1 of these control data, and the decoder 32 is controlled with the bits XI through XV in the binary form 00101 and will emit the bit XXV = 0 according to Table 2. The flip-flop stage 33 will be placed into its "0" state from its "1" state in response to the bit XXV = 0 so that the bit XIII = 0 will be produced at its output *d*. Therefore, that stage is reached again which was given above when the letter A was written. This state can be maintained as long as alphanumeric symbols are to be written.

It was hereinbefore presumed that the bits IX = 0 and X = 0. Therefore, alphanumeric symbols were written with the combination XIII = 0, IX = 0 and X = 0, whereas graphic symbols were written with the bit combination XIII = 1, IX = 0 and X = 0. One may envision a reservation of further bit combinations for other classes of characters. For example, with the bit combination XIII = 0, IX = 1, and X = 0, in combination with the bits I through VII, a further storage area of the read only memory 23 may be addressed, and this bit combination might be associated with a further class of characters. The decoder 32 would then supply output signals depending on the bits XI through XV, which permit the provision of the bits XIII = 0, IX = 1 and X = 0 as long as desired.

Table 2 shows that combinations of the bits XI through XV cause the production of the bit XXV = 1. With the help of these two bit combinations, not only the state of the flip-flop stage 33 will be changed, but also another control will be effected. In the sample embodiment disclosed herein, a signal will be emitted to the control stage 30 by way of the output *b* of the decoder 32. This signal causes a brightness control of the cathode ray with the bit combination XI through XV of 10001, and a dark control of the cathode ray with the bit combination 01001.

A character generator 13 has been described with reference to FIGS. 1 and 2 which, in particular, is suited for the control of the cathode ray of the picture tube 19 illustrated in FIG. 1. The character generator 13 illustrated in FIG. 2, however, can also basically be utilized for the control of an ink writer. In this case, no picture repetition memory 12 will be required and the data will be supplied directly from a character input system to the address selection stage 21 of the character generator 13. The character generator 13 illustrated in FIG. 2 can also be applied in combination with other character systems as far as these character systems can be controlled by the signals produced with the help of the character generator 13.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. An operational method for the representation of characters consisting of character elements in which data are fed-in in the form of words from a character input system and a read only memory stores the character element data and a deflection unit causes the deflection of a character producing device in accordance with the character segment data, comprising the steps of:

storing a data bit in a storage cell having a binary value dependent upon control data stored in the read only memory; forming address words partially from data bits supplied by the character input system and partially from the bits stored in said storage cell;

reading the control data from the read only memory with an address word and changing the binary value of the stored bit to a second value;

forming address words partially from the data bits provided by the character input system and partially of the second value of the stored data bit;

reading control data from the read only memory with a second address word; and controlling the deflection unit with the control data read from the read only memory.

2. A circuit arrangement for representing characters consisting of character elements, comprising:

a character input system providing words having a plurality of data bits;

a read only memory storing a character element data as control data; a deflection type character writing device;

a deflection unit connected between said character writing device and said read only memory;

a storage cell for storing a data bit whose binary value depends on control data read from said read only memory; means for forming address words partially from the data bits received from said character input system and partially from the bits stored in said storage cell, said means connected to said read only memory and operable to access said memory; a decoder connected between said read only memory and said storage cell and operable to determine the binary value of the bits stored in said storage cell in accordance with the control data read from said memory; and means connecting said read only memory to said deflection unit for effecting operation of said character writing device in accordance with the character element control data read from said memory.

3. A circuit arrangement according to claim 2, comprising a register connected to said read only memory for storing the character element data and control data provided by said read only memory, said register including a plurality of digit sections, first and second switch stages, a first control stage connected to two of said digit sections and to said first switch stage and operable in accordance with the data of said two sections to operate said first switch stage, said first switch stage having a plurality of switch positions, other sections of said register connected to said second switch stage, a second control stage for operating said character writing device, and a third control stage for controlling said character writing device, an address selector stage and an address counting register, additional sections of said register connected with said read only memory by way of said address selector stage and said address counting register by way of said second switch stage, and connectable by way of said second switch stage to said decoder.

4. A circuit arrangement for representing characters consisting of character elements, comprising:

a character input system providing words having a plurality of data bits;

a read only memory storing character element data as control data;

a deflection type character writing device;

a deflection unit connected between said character writing device and said read only memory;

a bistable flip-flop stage for storing a data bit whose binary value depends on control data read from said read only memory;

means for forming address words partially from the data bits received from said character input system and partially from the bits stored in said flip-flop stage, said means connected to said read only memory and operable to access said memory;

a decoder connected between said read only memory and said flip-flop stage and operable to determine the binary value of the bits stored in said flip-flop stage in accordance with the control data read from said memory; and means connecting said read only memory to said deflection unit for effecting operation of said character writing device in accordance with the character element control data read from said memory.

* * * * *